United States Patent [19]

Kerb et al.

[11] 3,843,631
[45] Oct. 22, 1974

[54] 18-NOR-14-BETA-PREGNANO-(13,14-F)-HEXAHYDRO-1,4-OXAZEPIN-3-ONES

[76] Inventors: Ulrich Kerb, 8, Waitzstrasse; Rudolf Wiechert, 38, Endestrasse; Ulrich Eder, 30, Billerbecker Weg; Hans-Detlef Berndt, 10 a, Waldsangerpfad, all of Berlin, Germany

[22] Filed: Mar. 19, 1973

[21] Appl. No.: 334,971

Related U.S. Application Data

[63] Continuation-in-part of Ser. No. 236,172, March 20, 1972, abandoned.

[52] U.S. Cl......... 260/239.3 P, 260/397.5, 424/244
[51] Int. Cl............................................. C07d 87/54
[58] Field of Search............................. 260/239.3 P Primary Examiner—Henry R. Jiles
Assistant Examiner—Robert T. Bond
Attorney, Agent, or Firm—Samuel L. Welt; John S. Saxe; George M. Gould

[57] ABSTRACT

A novel class of cardiac and CNS active 18-nor-14$\beta$-pregnano-[13,14-f]-hexahydro-1',4'-oxazepin-3'-ones are prepared by base treatment of corresponding 14-$\beta$,16,20-trihydroxy-18-N-acylamino pregnanes. The final products are also useful as intermediates in the synthesis of other cardiac agents such as batrachotoxinin.

13 Claims, No Drawings

18-NOR-14-BETA-PREGNANO-(13,14-F)-HEXAHYDRO-1,4-OXAZEPIN-3-ONES

RELATED APPLICATION

This application is a continuation inpart of application Ser. No. 236,172, filed Mar. 20, 1972, now abandoned.

BRIEF DESCRIPTION OF THE INVENTION

The present invention relates to a new class of 18-nor-14β-pregnano-[13,14-f]-hexahydro-1',4'-oxazepin-3'-ones having the general formula

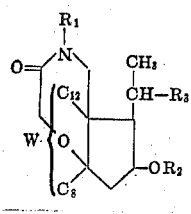

I wherein
$R_1$ is hydrogen or lower alkyl, lower alkenyl and lower alkynyl, $R_2$ and $R_3$ are hydrogen or acyl, and W is the remainder of the steroid molecule which may contain additional substituents in rings A, B and C.

A further aspect of the present invention involves a process for the preparation of compounds of formula I wherein a 14,16,20-trihydroxy-18-N-acylamino pregnane of the general formula

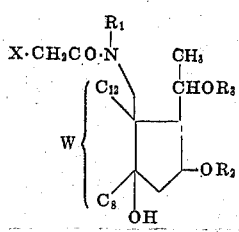

II wherein
W, $R_1$, $R_2$ and $R_3$ are as above and
X is halogen or sulfonyloxy,
is treated with base in a suitable organic solvent. If desired, free hydroxy groups may then be esterified or acyl groups removed in a manner known per se.

The steroid residue W can, for example, contain free or functionally modified substituent groups, preferably esterified hydroxy groups in the 1-, 3-, 6-, 7-, 9- and 11-positions, keto groups in the 3-, 6-, 7- or 11-positions, epoxy ring, especially in the 9,11-position, lower alkyl groups preferably in the 1-, 2-, 6- or 7-positions and if desired also a halogen atom, most preferably chloro or fluoro in the 6- and 9-positions. Should the rings A and B be cis coupled then where a 3-keto group and a 9α-hydroxy group both are present they may be joined together through a half acetal bond.

A preferred steroid residue W is, for example,

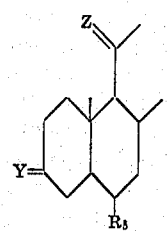

wherein
Y is an oxygen atom or H, OR'
wherein
R' is hydrogen, acyl, lower alkyl, phenyl lower alkyl, lower alkoxy lower alkyl or tetrahydro-pyranyl,
$R_5$ is hydrogen, hydroxy or lower acyloxy, and
Z is an oxygen atom,
H,H or H,OR" where R" is hydrogen or acyl.

As used herein the term "lower" when used to modify hydrocarbon radical groups such as alkyl, alkenyl and alkynyl, is meant to include groups having from 1 to 7 carbon atoms. Examples of suitable lower alkyl groups include methyl, ethyl, isopropyl, tertiary butyl, heptyl and the like. Examples of suitable lower alkenyl groups include ethenyl, propenyl, isopropenyl, vinyl, methallyl, and the like. Examples of lower alkynyl groups useful in the practice of the present invention include ethynyl, propynyl, and the like.

Examples of suitable lower alkoxy lower alkyl groups include methoxy methyl, methoxyethyl, and the like.

The acyl groups useful in the practice of the present invention are derived from carboxylic acids and have their valence bond in place of the carboxyl hydroxy group. Suitable acyl groups include those which are conventionally utilized in steroid chemistry for the esterification of free hydroxyl groups. Such groups can be straight chain or branched chain, saturated or unsaturated and may contain one or more carboxyl groups. Preferred acyl groups are obtained from carboxylic acids having from one to eleven carbon atoms.

Examples of suitable carboxylic acids from which acyl groups may be derived include the alkanoic acids such as formic acid, acetic acid, propionic acid, caproic acid, enanthic acid, undecyl acid, fluoroacetic acid, hydroxy acetic acid, amino acetic acid, diethyl acetic acid, trimethyl acetic acid, tertiary butyl acetic acid, cyclopentyl propionic acid, cyclohexyl acetic acid, phenyl acetic acid, and the like. Succinic acid represents a suitable dicarboxylic acid. Aromatic carboxylic acids may also be employed for this purpose such as, for example, benzoic acid.

Preferred halogens in the definition of X of starting material of formula II include chloro, bromo and iodo. When X is sulfonyloxy then it is understood that it may be derived from those aliphatic or aromatic sulfonic acids which are generally employed for the esterification of hydroxyl groups. Especially preferred for this purpose are mesyloxy and tosyloxy.

Steroid compounds in which the 13- and 14-position carbon atoms are bonded through a [13,14-f]-hexahydro-1,4-oxazepine ring (A) or a [13,14-f]-hexahydro-1,4-oxazepin-3-one ring (B) as well as methods for their preparation have already been described in the art.

According to Belgian Pat. No. 731,169, the ring closing for the preparation of compounds Type A from 18-(methyl-2'-hydroxy- or preferably 2'-acetoxy-ethylamino)-pregnanes can be carried out in the presence of potassium hydroxide, provided that the carbon atom at the 14-position of a starting steroid must be activated in some appropriate way, such as through a 8(14)- or 14(15)-double bond, so that the desired cyclization, which can be conceived of as a nucleophilic addition reaction, can achieve the proper state.

The preparation of a compound of Type B was described by L. Berner-Fenz, H. Berner, W. Graf and H. Wehrli in *Helv. Chimica Acta* 53, 2258–2265 (1970), wherein 3β,20-diacetoxy-14β-hydroxy-18-(N-methyl-N-chloracetyl amino)-5α,17α-pregnane was converted into 3β,20ε-diacetoxy-N-methyl-18-nor-5α,14β,17α-pregnano-[13,14-f]hexahydro-1′,4′-oxazepin-3′-one by treatment of the former compound with excess sodium borohydride. The above-described process employed a simply constituted steroid as a starting steroid which besides the 14β—OH group or a 20-acyloxy group did not contain in addition a free hydroxy group in the D-ring and/or in the 17-position.

In the practice of the present invention, there is obtained a successful ring closure obtaining only formation of the [13,14-f]—hexahydro-oxazepinone ring. The selective reaction course was highly unexpected and was in no way foreseeable since the 14 —OH— group of the starting material of the present invention is not even activated by an appropriate substituent and additionally the starting material contains free hydroxyl groups in the 16- and 20-positions, which as one skilled in the art knows, in the chemical reaction in question are more labile than the tertiary 14—OH—group.

The process of the present invention can be successfully conducted in an organic solvent and in the presence of a base cyclization catalyst. Preferably, atmospheric air is excluded and the process is run in a water-free reaction medium in order to insure good yield and purity of the desired produces. Exclusion of the atmospheric air can be readily obtained by utilizing a protective gas blanket over the reaction mixture such as, for example, nitrogen or argon.

Suitable solvents include neutral and basic reactive solvents. As neutral solvents there may be included, for example, dioxane, tetrahydrofuran, straight or branched chain alcohols, such as methanol, ethanol or tertiary butanol, ether, dimethyl sulfoxide, dimethyl formamide, benzene, toluene or also halogenated hydrocarbons, such as methylene chloride, ethylene chloride, chloroform, carbon tetrachloride and the like. Suitable basic solvents include, for example, pyridine, piperidine, lutidine, collidine, triethylamine, diisopropylethylamine and the like. The latter solvents can function as solvents as well as bases. It should also be understood that various solvent mixtures may be employed herein.

Bases commonly employed for the conduct of cyclization reactions may be utilized in the practice of the present invention. Suitable bases include the salts, especially alkali salts of straight or branched chain alcohols, such as for example sodium methylate, sodium ethylate, potassium-tertiary butylate. Suitable organic bases include those which have been given as examples above. Additionally useful in the practice of the present invention are also sodium hydride or alkali hydroxide, alkali carbonate and alkali hydrogen carbonate, such as for example potassium hydroxide, sodium carbonate or sodium bicarbonate, which may be employed in the reaction mixture either in pulverized or dissolved form.

The reaction temperature is not broadly critical in the practice of the present invention. Thus, the desired cyclization can be readily conducted at low reaction temperatures such as, for example, below 0°C. i.e., in the range of from about −15° to −20°C. at a rapid reaction rate and with an excellent yield. It is also possible to utilize temperatures such as room temperature or even the reflux temperature of the solvent with good results. When utilizing higher reaction temperatures it must be kept in mind that the starting material may contain substituents which can be affected. Thus, for example, a present 3-acetyloxy group would be unaffected by utilizing a low reaction temperature, whereas, when a higher reaction temperature is employed, it may be saponified.

It is within the scope of the art that subsequent to the ring closure reaction forming the 1′,4′-oxazepin-3′-one system to esterify, if desired, the 20- and/or 16-hydroxy groups as well as to split off any acyl groups present in the molecule utilizing procedures well known in the art for this purpose. The esterification can be conducted conveniently utilizing a reactive derivative such as the anhydride of the desired acid. When utilizing acid esterification conditions, it is preferable to utilize as esterification catalyst, perchloric acid or p-toluene sulfonic acid, while with basic esterification, the reaction is conducted preferably in pyridine at elevated reaction temperatures. When converting a 16,20-dihydroxy-1′,4′-hexahydro-oxazepin-3′-one steroid into its 16-monoacylate, then it is preferred to employ a basic reaction medium for the esterification.

The removal of the acyl groups can be readily accomplished utilizing alkali hydrolysis such as, for example, with potassium hydroxide in methanol or potassium tertiary butylate in tetrahydrofuran.

The compounds of the present invention exhibit valuable pharmacological activity. Included therein are blood pressure, lowering and diuretic activity, positive inotropic and myotropic activity, increase of the heart muscle blood flow and the increase in the stroke minute volume of the heart. They have mild sedative effects and are used primarily in the treatment of neurotic disorders. They can also be used in treatment of alcoholism and the therapy of certain types of epilepsy and convulsive states.

The compounds of the present invention may be employed in the form of pharmaceutical preparations which contain them in admixtures with a pharmaceutical, organic or inorganic carrier material which is suitable for enteral or parenteral application, such as for example, water, gelatin, lactose, starches, magnesium stearate, talc, vegetable oils, gum arabic, polyalkylene glycols, vaseline, etc. Pharmaceutical preparations can be prepared in solid form, e.g., as tablets, dragees, suppositories, capsules, or in liquid form, e.g., solutions, suspensions or emulsions. They may be sterilized and/or contain additives such as preserving, stabilizing, wetting or emulsifying agents, salts for varying the osmotic pressure or buffers. They can also contain other therapeutically valuable substances.

The compounds of the present invention can be administered at doses adjusted to individual requirements and fitted to the pharmaceutical exigencies of a situation. Convenient pharmaceutical dosages are in the range of from about 0.001mg. to about 10 mg. per day.

In addition, the compounds of the present invention are useful as intermediates as well as starting materials for the synthesis of highly active steroid compounds such as, for example, batrachotoxinin A.

The process starting materials of formula II have not been previously known in the art. An important factor in their preparation is the introduction of a 13β-position N—$R_1$—N—(X, acetyl)-aminomethyl substituent near the 14β-position hydroxyl group. As an example of the preparation of the new starting materials of compound II, there is described below the preparation of 3β-acetoxy-14β,16β,20β-trihydroxy-18-(N-methyl-N-chloracetyl-amino)-5β-pregnane from 3β-acetoxy-16α,17α-oxido-5β-pregnan-3-one.

To a solution containing 300 g. of 3β-acetoxy-16α,17-epoxy-5β-pregnan-20-one in 6,000 ml. of tetrahydrofuran there was added dropwise a solution containing 150 g. of sodium borohydride dissolved in 750 ml. water and the resulting solution was stirred for 2 hours at 25° – 30°C. The reaction mixture was poured into ice water, acidified with dilute sulfuric acid and extracted with methylene chloride. The methylene chloride phase was washed to neutrality and concentrated. There was thus obtained 20R and 20S: 3β-acetoxy-16α,17-epoxy-5β-pregnan-20-ol which was utilized without further purification in the next step.

An analytical sample was fractionally crystallized from acetone-hexane to yield 20R: 3β-acetoxy-16α,17-epoxy-5β-pregnan-20-ol melting at 178° – 179°C.; and 20S: 3β-acetoxy-16α,17-epoxy-5β-pregnan-20-ol melting at 129.5° – 130.5°C.

A total of 70 g. of 3β-acetoxy-16α,17-epoxy-5β-pregnan-20-ol was mixed in 6,000 ml. of cyclohexane with 400 g. of lead tetraacetate and 52.8 g. of iodine and the mixture was heated with stirring under reflux for 90 minutes with air radiation by 3-300 Watt lamps. The reaction mixture was then cooled to 15°C., the insoluble salts filtered off and washed with cyclohexane. The filtrate was washed with sodium thiosulfate solution and then with water. The filtrate was then concentrated in vacuo. The residue was dissolved in 2,000 ml. of glacial acetic acid and then was stirred with 70 g. of silver acetate for 30 minutes at 100°C. and thereafter added to ice water. The resulting precipitate was filtered off, taken up in methylene chloride and the filtered neutrally washed methylene chloride solution, concentrated in vacuo. The residue was chromatographed on silica gel. There was eluted with hexane-acetone mixture the 3β,18-diacetoxy-16α,17,18,20-bisepoxy-5β-pregnane. After recrystallization from acetone-hexane, there was obtained the 20R: 18-diastereomeric mixture melting at 112° – 114°C. and the 20S: 18-diastereomeric mixture melting at 149.5° – 160°C.

A total of 234 g. of 3β,18-diacetoxy-16α,17,18,20-bisepoxy-5β-pregnane was dissolved in 2,200 ml. of methanol, cooled to 0°C., treated with a solution of 8.8 g. of potassium hydroxide in 800 ml. of methanol and then stirred for 90 minutes at about +2°C., then, together with 10 ml. of glacial acetic acid, the reaction mixture was concentrated in vacuo, the residue dissolved in methylene chloride and chromatographed on silica gel. Utilizing a hexaneacetone mixture, there was eluted 3β-acetoxy-16α,17,18,20-bisepoxy-5β-pregnan-18-ol. After recrystallization from acetone-hexane, there was obtained the 20R: 18-diastereomeric mixture melting at 182° – 184°C. and the 20S: 18-diastereomeric mixture melting at 160° – 167°C.

A total of 88 g. of 3β-acetoxy-16α,17,18,20-bisepoxy-5β-pregnan-18-ol was dissolved in 1,250 ml. of dimethyl sulfoxide, 430 ml. of triethylamine was added and then with stirring and cooling at 15°C. a total of 300 g. of a pyridine-sulfurtrioxide complex was added portionwise. After 20 minutes, the reaction mixture was stirred into 10 l. of ice water, 230 ml. of concentrated hydrochloric acid and 180 g. of sodium acetate were added, the precipitated reaction product filtered off, washed with water and taken up in methylene chloride. The methylene chloride solution was concentrated in vacuo, the residue dissolved in benzene and chromatographed on silica gel. The product 3β-16α,17-epoxy-20-oxo-5β-pregnan-18-al was eluted with hexane-acetone (7:3) and after recrystallization from acetone melted at 169° – 170°C.

A total of 70 g. of 3β-acetoxy-16α,17-epoxy-20-oxo-5β-pregnan-18-al was dissolved in 1,200 ml. of pyridine, 430 Ml of water and 160 g of chromium (II) acetate was then added with ice cooling. The reaction mixture was stirred for 75 minutes at approximately 20°C., thrown into sulfuric acid containing ice water and then extracted with methylene chloride. The methylene chloride solution was washed to neutrality with water, dried over sodium sulfate and concentrated in vacuo. There was thus obtained 65 g. of crude 16α-hydroxy-3β-acetoxy-20-oxo-5β-pregnan-18-al (melting point 189° – 193°C. with decomposition), which was dissolved in 600 ml. of absolute tetrahydrofuran and under ice cooling was treated dropwise with a solution of 75 g. of lithium aluminum tri-tert-butoxyhydride in 500 ml. of tetrahydrofuran. The reaction solution was stirred for 15 minutes at 5°C. and then thrown into hydrochloric acid containing ice water. The reaction product was filtered off, washed to neutrality with water, taken up in methylene chloride and concentrated in vacuo. The residue was chromatographed on silica gel. Utilizing a hexane-acetone mixture, there was eluted 20R: 16α,18-dihydroxy-3β-acetoxy-18,20-epoxy-5β-pregnane and after recrystallization from acetone-hexane, the product melted at 115° – 125°C.

A total of 43.1 g. of 20R: 16α,18-dihydroxy-3β-acetoxy-18,20-epoxy-5β-pregnane was dissolved in 600 ml. of glacial acetic acid, treated with a solution containing 89 g. of chromium trioxide in 340 ml. of water and stirred for 30 minutes at 20° – 25°C. The reaction mixture was then thrown into ice water, the resulting precipitate filtered off, washed and then taken up in methylene chloride. The washed to neutrality, dried methylene chloride solution was concentrated and the residue recrystallized from acetone-hexane. There was thus obtained 20R: 20-hydroxy-3β-acetoxy-16-oxo-5β-pregnan-18-acid lactone (18 → 20) melting at 181.5° – 182.5°C.

A total of 45 g. of 20R: 20-hydroxy-3β-acetoxy-16-oxo-5β-pregnan-18-acid lactone (18 → 20) in 820 ml. of glacial acetic acid was warmed to 60°C. and then treated dropwise with 120 ml. of a bromine solution in glacial acetic acid (6.1 ml. of $Br_2$). The reaction mixture was stirred for 30 minutes at 60°C. and then thrown into sodium acetate containing ice water. The resulting precipitate was filtered off, washed with water, taken up in methylene chloride and after washing to neutrality, the dried methylene chloride solution was concentrated in vacuo. The residue was dissolved in 500 ml. of dimethylformamide and then together with 23 g. of lithium carbonate and 16 g. of lithium bromide stirred for 30 minutes at 125°C. After cooling to 20°C., the reaction mixture was thrown into glacial acetic acid containing ice water, the precipitated produce filtered off, washed with water to neutrality and dried. After recrystallization from acetone-hexane there was obtained 20R: 20-hydroxy-3β-acetoxy-16-oxo-5β-pregn-14-en-18-acid lactone (18 → 20) melting at 166.5° – 170°C.

A total of 30.7 g. of 20R: 20-hydroxy-3β-acetoxy-16-oxo-5β-pregn-14-en-18-acid lactone (18 → 20) was heated at reflux in 300 ml. of tetrahydrofuran with 32 g. of lithium aluminum-tri-tert.-butoxyhydride and thereafter thrown into sulfuric acid containing ice water. The resulting precipitated product was filtered off, washed to neutrality with water and dried. After recrystallization from acetone-hexane, there was obtained 20R: 16β,20-dihydroxy-3β-acetoxy-5β-pregn-14-en-18-acid lactone (18 → 20) melting at 192.5° – 194.5°C.

A total of 30.7 g. of 20R: 16β,20-dihydroxy-3β-acetoxy-5β-pregn-14-en-18-acid lactone (18 → 20) was heated at reflux in 300 ml. of methylene chloride with 30 g. of sodium sulfate, 15 g. of potassium acetate and 30 ml. of 40 percent peracetic acid for a period of 60 minutes. The reaction mixture was diluted with methylene chloride, the methylene chloride solution was washed to neutrality with sodium carbonate solution and water and then concentrated. The residue was chromatographed on silica gel. There was eluted with hexane-acetone mixture (7:3) 20R: 16β,20-dihydroxy-3β-acetoxy-14,15β-epoxy-5β,14β-pregnan-18-acid lactone (18 → 20) which after recrystallization from acetone-cyclohexane melted at 200.5° – 201°C.

A total of 21 g. of 20R: 16β,20-dihydroxy-3β-acetoxy-14,15β-epoxy-5β,14β-pregnan-18-acid lactone (18 → 20) was heated at reflux in 2,000 ml. of absolute tetrahydrofuran with 20 g. of lithium aluminum hydride for 1 hour. The reaction mixture was cooled in an ice-methanol bath and then treated dropwise with ethylacetate until the excess lithium aluminum hydride was decomposed. Then together with 5.1 of ethylacetate the ethylacetate solution was washed to neutrality with in sulfuric acid and water and then concentrated. The residue was recrystallized from tetrahydrofuran-ethylacetate. There was thus obtained 3β,14β,16β,18,20-pentahydroxy-5β-pregnane melting at 220° – 222°C.

A total of 2.5 g. of 3β,14β,16β,18,20-pentahydroxy-5β-pregnane was dissolved in 150 ml. of tetrahydrofuran and stirred for 3 hours at 0° – 5°C. with 100 ml. of acetone and 0.1 ml. of boron trifluoride etherate. Thereafter, the reaction mixture was, together with 1 ml. of pyridine, concentrated in vacuo. The residue was dissolved in 16 ml. of pyridine and toghether with 8 ml. of acetic anhydride, heated for 3 hours at 100°C. The solvent was removed in vacuo, the residue treated with cyclohexane, again concentrated and then kept for 30 minutes at room temperature with 32 ml. of tetrahydrofuran and 3.2 ml. of 2N hydrochloric acid. The mixture was then diluted with methylene chloride, washed to neutrality and concentrated in vacuo. The residue was recrystallized from acetone-hexane. There was thus obtained 14β,18,20-trihydroxy-3β,16β-diacetoxy-5β-pregnane melting at 103° – 105°C.

To a total of 3.8 g. of 14β,18,20-trihydroxy-3β,16β-diacetoxy-5β-pregnane in 19 ml. of dimethyl sulfoxide and 17 ml. of triethylamine, there was added slowly dropwise a total of 11 g. of pyridine-sulfur trioxide complex and 35 ml. of dimethyl sulfoxide at a rate that the temperature did not exceed 20°C. The reaction mixture was then stirred for 60 minutes at 20°C., diluted with methylene chloride and the methylene chloride solution washed to neutrality with ice-cold 0.1 N hydrochloric acid and water and then concentrated in vacuo. The residue was dissolved in benzenemethylene chloride and chromatographed on silica gel. Elution with hexane-acetone (1:1) gave 14β,18-dihydroxy-3β,16β-diacetoxy-18,20-epoxy-5β-pregnane which after recrystallization from cyclohexane melted at 94° – 98°C.

A total of 580 mg. of 14β,18-dihydroxy-3β,16β-diacetoxy-18,20-epoxy-5β-pregnane was heated at 120°C. in a pressure flask with a solution of 9 ml. of ethanol and 1 ml. of methylamine over a period of 4.5 hours. Thereafter, the reaction mixture was concentrated in vacuo, the residue dissolved in 6 ml. of glacial acetic acid and then together with 200 mg. of platinum oxide hydrogenated at 80°C. It was worked up by eluting the reaction mixture with methylene chloride, filtering off the catalyst, washing with methylene chloride and the total filtrate was washed to neutrality with sodium bicarbonate and water. The residue was dissolved in 10 ml. of absolute tetrahydrofuran and cooled to 0°C. and then treated dropwise with 11.3 ml. of a chloracetyl chloride solution in tetrahydrofuran (0.67 ml. of chloracetyl chloride in 100 ml. of tetrahydrofuran). The mixture was stirred for 10 minutes at 0° – 5°C., thrown into ice water, extracted with methylene chloride, washed to neutrality with water and concentrated. By thin-layer chromatography utilizing a benzene-methanol (8:2) system, there was isolated 18-(methyl chloracetyl amino)-14β,16β,20β-trihydroxy-3β-acetoxy-5β-pregnane, which when recrystallized from acetone-pentane melted at 192°-193°C.

As another example of the preparation of the new starting material of compound II, there is described below the preparation of 18-(N—methyl—N—chloracetylamino)-14-hydroxy-3α,6β,11α,16β,20β-pentaacetoxy-5β,14β-pregnane from 16α,17α-epoxy-4-pregnene-3,20-dione.

500 ml of liquid nutrient medium of the following composition 1.00 percent corn steep liquor
    1.00 percent soybean powder and
    0.05 percent soybean oil where inoculated with a prefermented culture of the strain Aspergillus ochraceus ATCC 1008, three weeks on sterilized corn. The suspension of the mycelum was used after a growth period of 2.5 days at 30°C in a rotating shaking vessel for the inoculation of a 20 liter fermenter. This fermenter was filled with 15 liters of a sterilized medium of the same composition as given above. The germination was carried out at 29°C while airing with 15 l per hour under stirring at 220 r.p.m. and occasional addition of silicon SH as anti-foaming. After a growth period of 24 hours, 900 ml of this preliminary fermentation were transferred to a 20 liter fermenter, which was charged with 14.1 liters of a sterilized medium of the same composition. The principal fermentation mass was then subjected to the same procedure as employed in the preliminary fermentation.

After 6 hours, 3.75 g. of 16β,17α-epoxy-4-pregnene-3,20-dione in 60 ml. of dimethylformamide filtered under sterile conditions were added and fermented. The course of the reaction was controlled by withdrawal of samples, extraction with methylisobutylketone and analysed by thin layer chromatography on silica-gel finished plates in the system chloroforme-methanol 95+5 and spraying with ethanol-sulfuric acid 9+1 and heating at 120°C for 5 minutes under exposure to near UV light. These samples were compared with standards.

After 32 to 34 hours of fermentation, the mycelum was filtered off and the filtrate extracted with methylisobutylketone. The mycelum was rewashed with methylisobutylketone. The extracts were concentrated at 40° – 50°C in vacuo until dry. The residue was washed with 100 ml of hot hexane to eliminate traces of silicon oil. The crude product is recrystallised from acetic ester in the presence of charcoal. 2.9 g of 6β,11α-dihydroxy-16α,17-epoxy-4-pregnene-3,20-dione were obtained; m.p. 228°–229°C.

A total of 60 g. 6β,11α-dihydroxy-16α,17-epoxy-4-pregnene-3,20-dione dissolved in 300 ml. of dimethylformamide was hydrogenated with 6 g. of palladium-calcium carbonate-catalyst (10 percent) at 21°C. The catalyst was filtered off, the filtrate concentrated under vacuum to half the starting volume and poured into ice water. The precipitated product was filtered off, dissolved in methylene chloride and the solution washed successively with 1 N hydrochloric acid, an aqueous solution of sodium hydrogencarbonate and water, and concentrated in vacuo. The residue was recrystallised from acetone-hexane. 54.1 g. of 6β,11α-dihydroxy-16α,17-epoxy-5β-pregnan-3,20-dione were obtained; m.p. 195° – 196°C.

A total of 53 g. of 6β,11α-dihydroxy-16α,17-epoxy-5β-pregnane-3,20-dione dissolved in 500 ml. of tetrahydrofuran was cooled down to –20°C. and a solution of 69 g. lithium-aluminium-tri-tert.-butoxyhydride in 250 ml. tetrahydrofuran was added within 15 minutes. The reaction mixture was stirred for 20 minutes at – 20°C. and then 100 ml. of methanol and 40 ml. of acetic acid were added. The reaction mixture was thrown under stirring into 1 liter of a saturated solution of sodium chloride and 0.5 l hydrochloric acid (20 percent) and separated from the tetrahydrofuran phase. The aqueous phase was repeatedly extracted with acetic ester. The unified acetic acetate and tetrahydrofuran solution were washed with an aqueous solution of sodium hydrogencarbonate and water and concentrated in vacuo. After recrystallization from acetic ester, the thus obtained 6α,6β,11α-trihydroxy-16α,17-epoxy-5β-pregnan-20-one melted at 189.5° – 190°C.

53.5 g. of 3α,6β,11α-trihydroxy-16α,17-epoxy-5β-pregnan-20-one were dissolved in 200 ml. of pyridine and stirred with 100 ml. of acetic anhydride for 16 hours at 20° – 25°C. The solution was poured into ice water, the precipitated product filtered off, washed with water and dried. After recrystallisation from acetone-cyclohexane, 53 g. of 3α,6β,11α-trihydroxy-16α,17-epoxy-5β-pregnan-20-one were obtained; m.p. 171.5° – 172°C.

To a solution containing 56 g. of 3α,6β,11α-trihydroxy-16α,17-epoxy-5β-pregnan-20-one in 560 ml. of tetrahydrofuran there was added dropwise, a solution containing 28 g. of sodium borohydride dissolved in 112 ml. water within 10 minutes and the resulting solution stirred at room temperature for 45 minutes. The reaction mixture was poured into ice water, acidified with diluted acetic acid, the precipitate filtered off, washed with water and dried. The thus obtained mixture of the diastomeres 20 R and 20 S of 20-hydroxy-3α,6β,11α-triacetoxy-16α,17-epoxy-5β-pregnane was utilized without further purification in the next step.

A total of 49 g. of 20-hydroxy-3α,6β,11α-triacetoxy-16α,17-epoxy-5β-pregnane was mixed in 4,300 ml. of cyclohexane with 288 g. of lead tetraacetate and 38.5 g. of iodine and the mixture was heated with stirring under reflux for 60 minutes with radiation by four 300 Watt lamps. The reaction mixture was then cooled to 10°C., the insoluble salts filtered off and washed with cyclohexane. The filtrate was washed with sodium thiosulfate solution, sodium hydrogencarbonate solution and then with water. The filtrate was then concentrated in vacuo. The residue was dissolved in 500 ml. of glacial acetic acid and then was stirred with 50 g. of silver acetate for 20 minutes at 100°C. and thereafter added to ice water. The resulting precipitate was filtered off, taken up in methylene chloride and the filtered neutrally washed with methylene chloride solution, concentrated in vacuo. The residue was chromatographed on silica gel. There was eluted with hexane-acetone mixture the 3α,6β,11α,18-tetraacetoxy-16α,17;18,20-bisepoxy-5β -pregnane.

A total of 48.4 g. of 3α,6β,11α,18-tetraacetoxy-16α,17;18,20-bisepoxy-5β-pregnane was dissolved in 1,000 ml. of methylene chloride, cooled to 0°C., treated with 500 ml. of a 0.15 percent methanolic solution of potassium hydroxide and then stirred for 3 hours at 0° to 5°C., then, together with 10 ml. of glacial acetic acid, the reaction mixture was concentrated in vacuo, the residue dissolved in methylene chloride and chromatographed on silica gel. Utilizing an acetone-methylene chloride mixture, there was eluted 20-hydroxy-3α,6β,11α-triacetoxy-16α,17-epoxy-5β-pregnan-18-al.

A total of 28 g. of 20-hydroxy-3α,6β,11α-triacetoxy-16α,17-epoxy-5β-pregnan-18-al was dissolved in 110 ml. of dimethyl sulfoxide, 154 ml. of triethylamine was added and then with stirring and cooling at 15°C. a total of 106.5 g. of a pyridine-sulfurtrioxide complex in 350 ml. of dimethyl sulfoxide was added dropwise within 10 minutes. After stirring 20 minutes at room temperature, the reaction mixture was stirred into ice water and neutralized with acetic acid, the precipitated reaction product filtered off, washed with water and taken up in methylene chloride. The methylene chloride solution was concentrated in vacuo, the residue chromatographed on silica gel.

Utilizing a methylene chloride-acetone mixture, there was eluted 3α,6β,11α-triacetoxy-16α,17-epoxy-20-oxo-5β-pregnan-18-al melting at 180°C. under decomposition after recrystallization from acetone-hexane.

A total of 17.2 g. of 3α,6β,11α-triacetoxy-16α,17-epoxy-20-oxo-5β-pregnan-18-al was dissolved in 344 ml. of pyridine, 113 ml. of water and 566 g. of chromium (II) acetate was then added with ice cooling. The reaction mixture was stirred for 90 minutes at room temperature, cooled down to 0.5°C. and 8.6 g. of sodium borohydride dissolved in 26 ml. of water are added dropwise within 10 minutes. After 10 minutes, the reaction mixture was thrown into 4 l. ice water containing 450 ml. of hydrochloric acid. The reaction product was filtered off, washed to neutrality with water and dried from acetone-hexane, the thus obtained 16α,18-dihydroxy-3α,6β,11α-triacetoxy-18,20-epoxy-5β-pregnane melted at 238°–240°C.

A total of 9.7 g. 16α,18-dihydroxy-3α,6β,11α-triacetoxy-18,20-epoxy-5β-pregnane was dissolved in 155 ml. of glacial acetic acid, treated with a solution containing 20 g. of chromium trioxide in 77 ml. of water and stirred for 30 minutes at 20° – 25°C. The reaction mixture was then thrown into ice water, the resulting precipitate filtered off, washed to neutrality and dried. After recrystallization from acetic ester, there was thus obtained 20-hydroxy-3α,6β,11α-triacetoxy-16-oxo-5β-pregnan-18-acid lactone (18 → 20) melting at 255° – 257°C.

A total of 8.2 g. of 20-hydroxy-3α,6β,11α-triacetoxy-16-oxo-5β-pregnan-18-acid lactone (18 → 20) in 82 ml. of glacial acetic acid was warmed to 60°C. and then treated dropwise with 18 ml. of a bromine solution in glacial acetic acid (1 ml. of $Br_2$/ml.) and 3 drops were added in excess. The reaction mixture was stirred for 10 minutes at 60°C. and then thrown into sodium acetate and sodium thiosulfate containing ice water. The resulting precipitate was filtered off, washed with water, taken up in methylene chloride and after washing to neutrality, the dried methylene chloride solution was concentrated in vacuo. The raw 15-bromo-20-hydroxy-3α,6β,11α-triacetoxy-16-oxo-5β-pregnan-18-acid lactone (18 → 20) was dissolved in 100 ml. of dimethylformamide and then together with 3.20 g. of lithium carbonate and 2.4 g. of lithium bromide stirred for 1 hour at 125°C. After cooling to 20°C., the reaction mixture was thrown into acetic acid containing ice water, the precipitated product filtered off, washed with water to neutrality and dried. After recrystallization from acetone-hexane, there was obtained 20-hydroxy-3α,6β,11α-triacetoxy-16-oxo-5β-pregn-14-en-18-acid lactone (18 → 20) melting at 230° – 231°C.

A total of 6.8 g. of 20-hydroxy-3α,6β,11α-triacetoxy-16-oxo-5β-pregn-14-en-18-acid lactone (18 → 20) was dissolved in 100 ml. of tetrahydrofuran and stirred with 9.6 g. of lithium aluminum-tri-tert.-butoxyhydride under cooling for 1 hour. Thereafter the reaction mixture was thrown into hydrochloride acid containing ice water. The resulting precipitated product was filtered off, washed to neutrality with water and dried. The thus obtained 16β,20-dihydroxy-3α,6β,11α-triacetoxy-5β-pregn-14-en-18-acid lactone (18 → 20) was dissolved in 200 ml. of ethylene chloride and stirred with 13.0 g. m-chloro peracetic acid for 90 minutes at room temperature. The reaction mixture was diluted with 1 l. of methylene chloride, the methylene chloride solution was washed to neutrality with sodium hydrogen sulfite solution and water and then concentrated in vacuo. The residue was chromatographed on silica gel. There was eluted with methylene chloride-acetone mixture 16β,20-dihydroxy-3α,6β,11α-triacetoxy-14,15β-epoxy-5β,14β-pregnan-18-acid lactone (18 → 20) which after recrystallization from acetic ester-hexane melted at 266° – 268°C. under decomposition.

A total of 2.5 g. of 16β,20-dihydroxy-3α,6β,11α-triacetoxy-14,15β-epoxy-5β,14β-pregnan-18-acid lactone (18 → 20) was heated at reflux in 50 ml. of tetrahydrofuran with 3 g. of lithium aluminum hydride dissolved in 90 ml. of tetrafuran for one hour. The reaction mixture was cooled down to – 10°C., then treated dropwise with 10 ml. of a saturated sodium chloride solution, diluted with 200 ml. of n-butanol and separated by filtration from the insoluble. The filtrate was washed with in sulfuric acid saturated sodium chloride solution and water and then concentrated in vacuo. The residue was recrystallized from acetone-ethylacetate. There was thus obtained 3α,6β,11α,14β,16β,18,20-heptahydroxy-5β,14β-pregnane melting at 274° – 275°C.

A total of 1.32 g. of 3α,6β,11α,14β,16β,18,20-hepta=hydroxy-5β,14β-pregnane was dissolved in 33 ml. of pyridine and stirred for 165 minutes at room temperature with 3.96 g. and triphenyl chloromethane. Thereafter, the reaction mixture poured into a saturad sodium chloride solution, the precipitated product was filtered off, taken up in methylene chloride and concentrated in vacuo. The residue was treated with pentane. The solution was decanted, concentrated in vacuo and heated under reflux in 12 ml. of pyridine and 6 ml. of acetic anhydride for 2 hours. The mixture was then poured into water, the precipitate filtered off, washed to neutrality, dried and heated at 100°C in 25 ml. of acetic acid (80 percent) for 10 minutes. After addition of carbon tetrachloride, the reaction mixture was concentrated in vacuo. This procedure was repeated until evaporation of the acetic acid. The residue was purified by thin layer chromatography with ether.

To a total of 260 mg. of 14β,18-dihydroxy-3α,6β,11α,16β,20β-pentaacetoxy-5β,14β-pregnane in 2 ml. of dimethyl sulfoxide and 1.6 ml. of triethylamine, there was added slowly dropwise a total of 800 mg. of pyridine-sulfur trioxide complex and 4 ml. of dimethyl sulfoxide within 30 minutes at 15° – 18°C. The reaction mixture was then stirred for 40 minutes at 20°C., poured into hydrochloric acid containing ice water, the precipitate filtered off, washed with water and dried. The residue was purified by thin layer chromatography. Elution with methylene chloride-acetic acetate (1:1) gave 182 mg. of 14-hydroxy-3α,6β,11α,16β,20β-pentaacetoxy-5β,14β-pregnan-18-al and 35 mg. of the starting material.

A total of 176 mg. of 14-hydroxy-3α,6β,11α,16β,20β-pentaacetoxy-5β,14β-pregnan-18-al was stirred with a solution of 12 ml. of ethanol and containing 1.2 ml. of methylamine for 15 minutes at 20°C. Thereafter, the reaction mixture was concentrated in vacuo, the residue dissolved in 20 ml. of methanol and then together with 80 mg. of platinum oxide and 3 drops of glacial acetic acid hydrogenated at 80°C. It was worked up by eluting the reaction mixture with methylene chloride, filtering off the catalyst, concentrated in vacuo and the residue purified by layer chromatography on silica gel. Elution with benzenemethanol 8 + 2 gave 106 mg. of 18-(N-methylamino)-14-hydroxy-3α,6β,11α,16β,20β-pentaacetoxy-5β,14β-pregnane.

A total of 100 mg. of 18 -(N-methylamino)-14-hydroxy-3α,6β,11α,16β,20β-pentaacetoxy-5β,14β-pregnane was dissolved in 10 ml. of absolute tetrahydrofuran and cooled to 0°C. and then treated dropwise with 0.05 ml. of chloracetyl chloride solution in 0.5 ml. tetrahydrofuran. The mixture was stirred for 10 minutes at 0°C., diluted with methylene chloride, washed to neutrality with water and concentrated in vacuo. By thin-layer chromatography utilizing a benzenemethanol (85:15) system, there was isolated 18-(N-methyl-N-chloracetyl amino)-14-hydroxy-3α,6β,11α,16β,20β-pentaacetoxy-5β,14β-pregnane.

It is within the scope of the present invention to additionally modify the resulting product such as, for example, to hydrolize a 3-acyloxy group, to oxidize a 3-hydroxy group to the ketone or to insert a double bond utilizing methods which are conventional in the art for this purpose.

EXAMPLE 10

A total of 55 mg. of 18-(N-methyl-N-chloracetylamino)-14-hydroxy-3α,6β,11α,16β,20β-pentaacetoxy-5β,14β-pregnane was dissolved in 10 ml. of absolute tetrahydrofuran, treated with 23.7 mg. of potassium tertiary butylate under cooling to $-15°C$. and stirred for 3 minutes at $-15°C$. After addition of two drops of glacial acetic acid, the reaction mixture was concentrated in vacuo, treated with carbon tetrachloride and evaporated. The residue was dissolved in chloroforme, placed on silica gel thin layer plates and chromatographed utilizing a carbon tetrachloride-methanol (93+7) system. There was obtained 3α,6β,11α,16β,20β-pentaacetoxy-4'-methyl-18-nor-5β,14β-pregnano-[13,14-f]-hexahydro-1',4'-oxazepin-3'-one.

NMR: $(CDCl_3)$ 1.07ppm s, C—19H, 1.21 ppm d 6 HzH21, 2.06 ppm 4s, 5xOCOCH$_3$, 2.64 ppm d 14 HzH18, 2.95 ppm s N—CH$_3$, 4.17 and 4.33 ppm d,d, 13 Hz, CO—CH$_2$—O, 4.75 ppm d, 14 HzH18, 4.75 ppm m H11, 5.09 ppm m, H3, H16, H20.

EXAMPLE 11

A total of 540 mg. of 3α,6β,11α,16β,20β-pentaacetoxy-4'-methyl-18-nor-5β,14β-pregnano-[13,14-f]-hexahydro-1',4'-oxazepin-3'-one were heated under reflux with 50 ml. of a solution of potassium hydroxide in methanol (2 percent) for 1 hour. The reaction mixture was neutralized with acetic acid and concentrated in vacuo. The residue was treated with carbon tetrachloride and concentrated. This procedure was repeated twice. The residue was then taken up with tetrahydrofuran, the precipitated potassium acetate filtered off and the filtrate concentrated. After addition of acetone, the 3α,6β,11α,16β,20β-pentahydroxy-4'-methyl-18-nor-5β,14β-pregnano-[13,14-f]-hexahydro-1',4'-oxazepin-3'-one melts at 222° – 225°C. under decomposition.

EXAMPLE 12

A total of 1 g. of 3α,6β,11α,16β,20β-pentaacetoxy-4'-methyl-18-nor-5β,14β-pregnano-[13,14-f]-hexahydro-1',4'-oxazepin-3'-one were stirred with 50 ml. of a solution of potassium hydroxide in methanol (10 percent) for 20 minutes at room temperature. After work-up in the manner indicated in example 11, the raw reaction product was placed on silica gel plates and chromatographed utilizing a chloroforme-methanol 9+1 system. There was thus obtained 500 mg. of 3α,16β,20β-trihydroxy-6β,11α-diacetoxy-4'-methyl-18-nor-5β,14β-pregnano-[13,14-f]-hexahydro-1',4'-oxazepin-3'-one.

We claim:
1. A compound of the formula

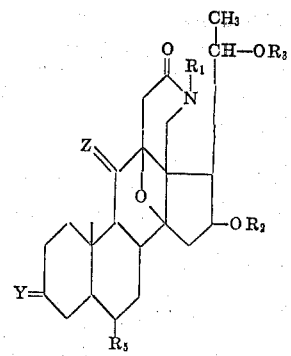

wherein Y is an oxygen atom or H, OR' where R' is hydrogen, $C_{1-11}$ carboxylic acid acyl, lower alkyl, phenyl lower alkyl, lower alkoxy lower alkyl or tetrahydropyranyl, $R_5$ is hydrogen, hydroxy or $C_{1-11}$ carboxylic acid acyloxy and Z is an oxygen atom; H,H or H,OR'' where R'' is hydrogen or $C_{1-11}$ carboxylic acid acyl; and $R_1$ is hydrogen, lower alkyl, lower alkenyl and lower alkynyl $R_2$ and $R_3$ are hydrogen or $C_{1-11}$ carboxylic acid acyl where $C_{1-11}$ carboxylic acid acyl as used above in all occurrences is selected from the group consisting of unsubstituted alkanoic acids, substituted alkanoic acids wherein the substituent is halogen, hydroxy amino, cyclopentyl, cyclohexyl or phenyl, unsubstituted alkanoic dicarboxylic acids and benzoic acid.

2. The compound of claim 1 which is 16β,20β-dihydroxy-3β-acetoxy-N-methyl-18-nor-5β,14β-pregnano-[13,14-f]-hexahydro-1',4'-oxazepin-3'-one.

3. The compound of claim 1 which is 3β,16β,20β-trihydroxy-N-methyl-18-nor-5β,14β-pregnano-[13,14-f]-hexahydro-1',4'-oxazepin-3'-one.

4. The compound of claim 1 which is 20β-hydroxy-3β,16β-diacetoxy-N-methyl-18-nor-5β,14β-pregnano-[13,14-f]-hexahydro-1',4'-oxazepin-3'-one.

5. The compound of claim 1 which is 3β,16β,20-triacetoxy-N-methyl-18-nor-5β,14β-pregnano-[13,14-f]-hexahydro-1',4'-oxazepin-3'-one.

6. The compound of claim 1 which is 16β,20β-dihydroxy-3α,11α-diacetoxy-4'-methyl-18-nor-5β,14β-pregnano-[13,14-f]-hexahydroxy-1',4'-oxazepin-3'-one.

7. The compound of claim 1 which is 3α,11α,16β,20-β-tetraacetoxy-4'-methyl-18-nor-5β,14β-pregnano-[13,14-f]-hexahydro-1',4'-oxazepin-3'-one.

8. The compound of claim 1 which is 3α-hydroxy-11α,16β,20β-triacetoxy-4'-methyl-18-nor-5β,14β-pregnano-[13,14-f]-hexahydro-1',4'-oxazepin-3'-one.

9. The compound of claim 1 which is 16β-hydroxy-3α,11α,20β-triacetoxy-4'-methyl-18-nor-5β,14β-pregnano-[13,14-f]-hexahydro-1',4'-oxazepin-3'-one.

10. A compound of claim 1 which is 3α,11α,16β,20-β-tetrahydroxy-4'-methyl-18-nor-5β,14β-pregnano-[13,14-f]-hexahydro-1',4'-oxazepin-3'-one.

11. A compound of claim 1 which is 3α,6β,11α,16β,-20β-pentaacetoxy-4'-methyl-18-nor-5β,14β-pregnano-[13,14-f]-hexahydro-1',4'-oxazepin-3'-one.

12. A compound of claim 1 which is 3α,6β,11α,16β,-20β-pentahydroxy-4'-methyl-18-nor-5β,14β-pregnano-[13,14-f]-hexahydro-1',4'-oxazepin-3'-one.

13. A compound of claim 1 which is 3α,16β,20β-trihydroxy-6β,11α-diacetoxy-4'-methyl-18-nor-5β,14β-pregnano-[13,14-f]-hexahydro-1',4'-oxazepin-3'-one.

\* \* \* \* \*

UNITED STATES PATENT OFFICE
CERTIFICATE OF CORRECTION

PATENT NO. : 3,843,631
DATED : October 22, 1974
INVENTOR(S) : Kerb, Wiechert, Eder and Berndt It is certified that error appears in the above-identified patent and that said Letters Patent are hereby corrected as shown below:

Cover page, after "[21] Appl. No.: 334,971" insert:

[30] Foreign Application Priority Data

February 25, 1972    West Germany    No. P 22 09 747.8

Signed and Sealed this

Sixth Day of July 1976

[SEAL]

Attest:

RUTH C. MASON
*Attesting Officer*

C. MARSHALL DANN
*Commissioner of Patents and Trademarks*